Sept. 9, 1924.
G. D. LUCE
Re. 15,914
TRASH IMPELLER
Original Filed July 8, 1916
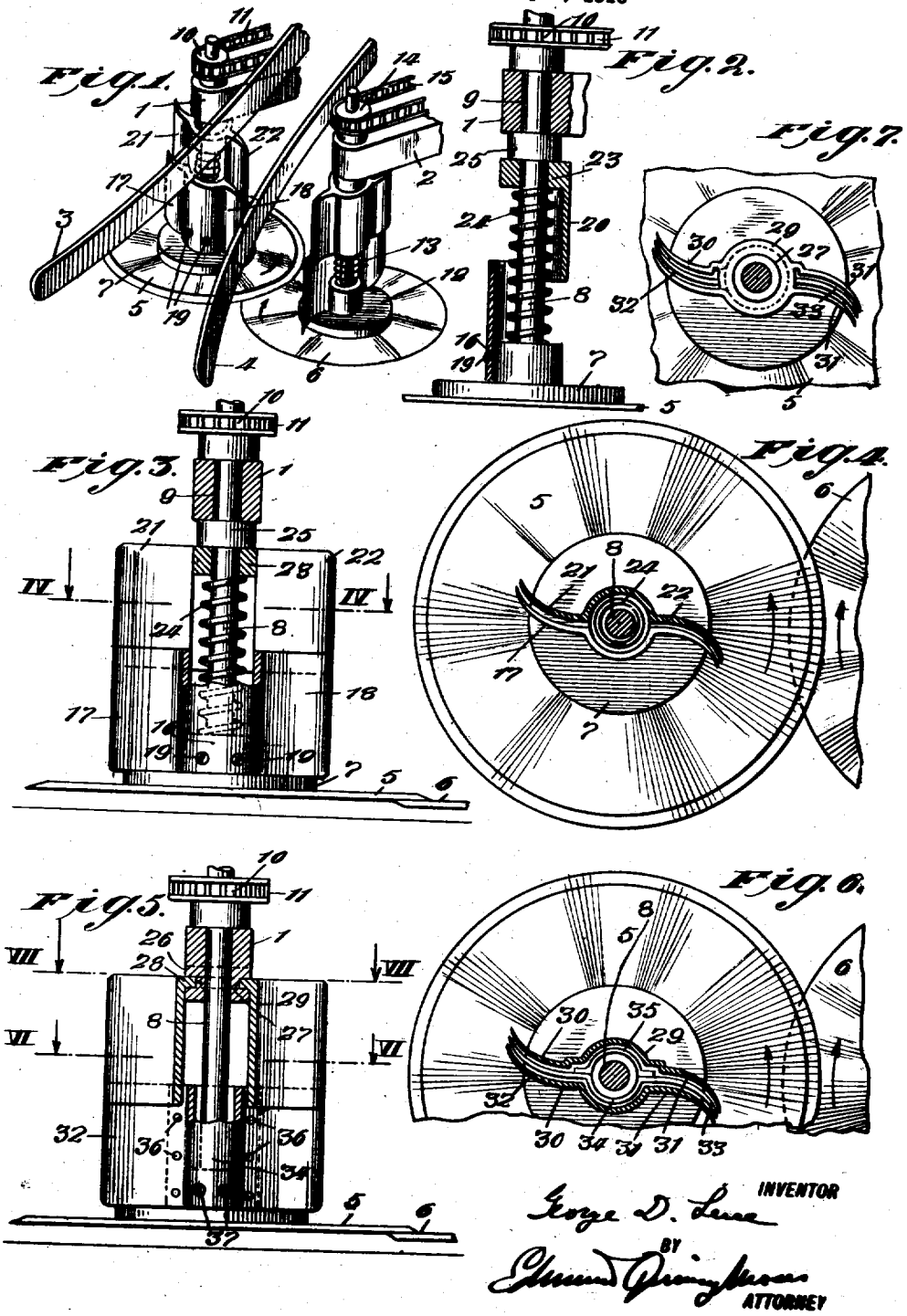
George D. Luce INVENTOR
BY
Edmund Quincy Sewall
ATTORNEY Reissued Sept. 9, 1924. Re. 15,914

UNITED STATES PATENT OFFICE.

GEORGE D. LUCE, OF WATERTOWN, WISCONSIN, ASSIGNOR TO LUCE CANE HARVESTER CORPORATION, OF NEW YORK, N. Y., A CORPORATION OF DELAWARE.

TRASH IMPELLER.

Original No. 1,207,580, dated December 5, 1916, Serial No. 108,176, filed July 8, 1916. Application for reissue filed October 2, 1919. Serial No. 328,065.

*To all whom it may concern:*

Be it known that I, GEORGE D. LUCE, a citizen of the United States, residing in Watertown, county of Jefferson, and State of Wisconsin, have invented certain new and useful Improvements in Trash Impellers, of which the following is a specification.

My invention relates to a device which is designed to prevent an accumulation of trash from interfering with the proper operation of rotary cutting knives, or other rotating parts, which must of necessity be placed relatively close to the ground in various types of harvesting machinery, and the like.

My invention is particularly useful in connection with sugar cane harvesters such, for instance, as the general type invented by me and illustrated and described in my U. S. Letters Patent No. 1,053,917 for cane strippers, patented Feb. 18, 1913. In this class of apparatus the standing cane, which is in more or less erect position, is preferably severed at a point close to the ground by means of rotary cutting knives, which are power-driven and usually mounted on vertical shafts. In many districts the cane fields are covered with an accumulation of trash which may include all sorts of vegetable growths, and also portions of the stalk or leaves from sugar cane which has been harvested in previous seasons. When it is attempted to force a sugar cane harvester through cane growing in a field of this sort, any rotating shaft, or like part which may be near enough to the ground to encounter this trash will immediately become wound around with the trash until its operation is seriously impaired, if not rendered impossible. This is particularly the case with reference to the vertical shafts carrying the rotary cutting knives or so-called "bottom cutters" which are found at the forward end of the type of harvester referred to. Through the necessary operation of these harvesters, the cane which is severed by the knives must pass between the vertical shafts carrying them, and if this space becomes clogged by trash winding itself about the shafts, the successful operation of the harvester becomes impossible. My invention, therefore, provides means for preventing an accumulation of trash about such rotating shafts and is designed not only to make it impossible for the trash to wind itself about these shafts, but is also efficient in forcibly removing such trash as may present itself in the region of the cutting knives and the mechanism which operates them, and passing it to the rear.

In the accompanying drawings which form a part of this specification,

Figure 1 is a perspective view showing one embodiment of my invention applied to a machine such as that described in my prior patent above referred to;

Figure 2 is a fragmentary vertical side elevation, parts being shown in central section, of one of the shafts and its associated mechanism;

Figure 3 is a front elevation of the mechanism shown in Figure 2, parts being shown in vertical section for the sake of clearness;

Figure 4 is a transverse sectional view on lines IV—IV of Figure 3;

Figure 5 is a view similar to Figure 3 showing a modification;

Figure 6 is a transverse sectional view on lines VI—VI of Figure 5;

Figure 7 is a transverse sectional view on line VII—VII of Figure 5.

Referring to the drawings in detail, the numerals 1 and 2 designate the forwardly extending arms of the frame of a cane harvester or like apparatus, which may be provided with the guides 3 and 4 for the purpose of aiding in delivering the uncut cane or the like to the rotary cutting knives or bottom cutters 5 and 6. The knife 5 is mounted upon a hub 7 secured in any suitable manner to a vertical shaft 8 which is provided with a bearing 9 in the arm 1. The upper end of the shaft is slidably secured to a sprocket wheel 10 driven by a chain 11 from any suitable source of power. Similarly the knife 6 is mounted upon a hub 12 secured to the shaft 13 journaled in the arm 2 and slidably secured at its upper end to the sprocket wheel 14, driven in any suitable manner, as by means of the chain 15. These knives rotate toward each other in opposite directions as indicated by the arrows in Figure 1.

As above indicated, if the shafts 8 and 13 are unprotected, the propulsion of the cane harvester through a cane field containing any considerable amount of trash will

BEST AVAILABLE COPY result in the trash winding about the shafts and clogging the space between them so as to prevent the proper operation of the harvester, and in many cases, make the cutting of cane impossible. To overcome this, I provide the shafts 8 and 13 with trash impellers, each of which may consist of a lower section 16 provided with outwardly extending fins or blades 17 and 18, which are preferably curved in opposite directions, as clearly shown in Figure 1. This lower section may be secured to the hub 7 in any suitable manner, as by means of the screws 19. The impeller may also be provided with an upper section 20 having the outwardly extending fins or blades 21 and 22, preferably curved similarly to the fins or blades 17 and 18, and adapted to overlap them and slide vertically along them. The shaft 8 may pass freely through the hub 23 of the upper section of the impeller, and a spring 24 may be provided for raising the upper section along the shaft until the upper surface of the hub 23 engages a spacing collar 25, through which the shaft 8 is free to slide. In practice, it is frequently desirable to raise or lower the shafts 8 and 13 so as to vary the distance which the knives 5 and 6 are from the surface of the ground. Consequently, the distance between the knives and the arms 1 and 2 is also subject to adjustment, and it is desirable to provide means for protecting the entire length of the shaft between the arm and the blade irrespective of what it may be. In the apparatus just described, this is accomplished through the overlapping of the fins or blades of the upper and lower sections of the impeller, the spring 24 always serving to keep the upper section resting against the collar 25. Should the distance between the knife 5 and the arm 1 be reduced, the fins or blades of the impeller will merely slide past each other for a correspondingly greater distance, and likewise, if the distance between the knife and the arm is increased, the amount of overlapping of the fins or blades will be correspondingly reduced. The shaft 13 is provided with an exactly similar arrangement except that the impeller on this shaft is preferably arranged at right angles to that upon the shaft 8, so that 90 degrees of movement of the shafts 8 and 13 is the maximum required to bring the blade of one impeller into action in the space between the shafts. As shown in the drawings, the trash impellers are preferably of less diameter than the rotary disc cutters so that the fins or blades do not reach to the edges of the cutters. Where the cutters overlap as illustrated, the fins or blades preferably have a radial length less than the radii of the cutters, minus the amount of overlap. This construction provides for a free passageway for the butts of the cane stalks between the impellers without interference from the latter.

In Figure 5 I have illustrated a modified form of construction in which the arm 1 is provided with a peripheral groove 27 which rotatably receives a shoulder or inturned flange 28 of the upper impeller section 29. This section is provided with two pairs of outwardly extending fins or blades 30 and 31, which are preferably curved as shown in Figures 6 and 7 and which are adapted to receive between them the curved fins or blades 32 and 33, respectively, of the lower section 34 of the impeller. This section may consist, as shown in Figures 5, 6 and 7, of a single piece of metal forming the two fins or blades and one-half the hub, to which is secured the second half 35 of the hub in any suitable manner, as by means of rivets 36. It will be seen that the action of the device of Figures 5, 6 and 7 is similar in many respects to that of the mechanism shown in Figures 1 and 2 except for the fact that the upper section of the impeller is rotatably suspended from the arms of the frame instead of using a spring to cause the separation of the fins or blades, and in the case of the device last described the lower section of the impeller is adapted to be received telescopically within the two pairs of fins or blades with which the upper section is provided. As before, the lower section is preferably driven from the hub to which each knife is secured, as by means of the screws 37. The device of Figures 5, 6 and 7 provides the same collapsing feature by which the distance between the knives and the arms of the frame may be adjusted without interfering with the efficient operation of the impellers.

While I have illustrated and described only certain specific embodiments of my invention, I realize that it is susceptible of wide application and I do not desire to be limited to the precise structure shown and described.

Having thus described my invention, I claim:—

1. In combination, in a machine designed to be operated in a region containing refuse or trash, an exposed shaft and a two-part horizontally divided trash impeller therefor.

2. In combination, in a machine designed to be operated in a region containing refuse or trash, an exposed shaft, and a trash impeller therefor including overlapping fins or blades mounted on said shaft.

3. In combination, in a machine designed to be operated in a region containing refuse or trash, an exposed shaft and a trash impeller therefor including telescoping fins or blades mounted on said shaft.

4. In combination, in a machine designed to be operated in a region containing refuse or trash, an exposed shaft and a plural part trash impeller therefor mounted on said shaft, said parts being relatively adjustable.

5. In combination, in a machine designed to be operated in a region containing refuse or trash, an exposed shaft and a plural part trash impeller therefor, a fin or blade on one of said parts and a fin or blade on the other of said parts overlapping that on the first.

6. In combination, in a machine designed to be operated in a region containing refuse or trash, an exposed shaft and a plural part trash impeller therefor, a fin or blade on one of said parts and a fin or blade on the other of said parts overlapping that on the first, said parts being relatively adjustable.

7. In combination, in a machine designed to be operated in a region containing refuse or trash, an exposed shaft and a plural part trash impeller therefor, a fin or blade on one of said parts and a fin or blade on the other of said parts overlapping that on the first, said parts being telescopically adjustable.

8. In combination, in a machine designed to be operated in a region containing refuse or trash, an exposed shaft, a plural part trash impeller therefor provided with projecting fins or blades, and means for separating said parts axially of said shaft.

9. In combination, in a machine designed to be operated in a region containing refuse or trash, an exposed shaft, a plural part trash impeller therefor provided with projecting fins or blades, and resilient means for separating said parts axially of said shaft.

10. In combination, in a machine designed to be operated in a region containing refuse or trash, an exposed shaft, a plural part trash impeller therefor provided with projecting fins or blades, and a spring for separating said parts axially of said shaft.

11. In combination, a shaft, a support therefor, a knife on said shaft, the distance between said knife and support being variable, and a plural part trash impeller for said shaft between said support and knife.

12. In combination, a shaft, a support therefor, a knife on said shaft, the distance between said support and knife being variable, a plural part trash impeller for said shaft, said impeller being axially adjustable with respect to said shaft.

13. In combination, a shaft, a support therefor, a knife on said shaft, the distance between said support and knife being variable, a plural part trash impeller for said shaft, said impeller being axially adjustable with respect to said shaft, and means for causing said impeller to extend through the space between said support and knife irrespective of the adjustment of the latter.

14. In combination, a shaft, a support therefor, a knife on said shaft, the distance between said support and knife being variable, a plural part trash impeller for said shaft, said impeller being axially adjustable with respect to said shaft, and automatic means for causing said impeller to extend through the space to be protected between said support and knife irrespective of the adjustment of the latter.

15. In combination, a shaft, a support therefor, a knife on said shaft, the distance between said support and knife being variable, a plural part trash impeller for said shaft, said impeller being axially adjustable with respect to said shaft, and resilient means for causing said impeller to extend through the space to be protected between said support and knife irrespective of the adjustment of the latter.

16. In combination, a shaft, a support therefor, a knife on said shaft, the distance between said support and knife being variable, a plural part trash impeller for said shaft, the parts of said impeller being relatively axially adjustable with respect to said shaft.

17. In combination, a shaft, a support therefor, a knife on said shaft, the distance between said support and knife being variable, a plural part trash impeller for said shaft, the parts of said impeller being relatively axially adjustable with respect to said shaft, and means for causing said impeller to extend through the space between said support and knife irrespective of the adjustment of the latter.

18. In combination, a shaft, a support therefor, a knife on said shaft, the distance between said support and knife being variable, a plural part trash impeller for said shaft, the parts of said impeller being relatively axially adjustable with respect to said shaft and automatic means for causing said impeller to extend through the space to be protected between said support and knife irrespective of the adjustment of the latter.

19. In combination, a shaft, a support therefor, a knife on said shaft, the distance between said support and knife being variable, a plural part trash impeller for said shaft, the parts of said impeller being relatively axially adjustable with respect to said shaft, and resilient means for causing said impeller to extend through the space to be protected between said support and knife irrespective of the adjustment of the latter.

20. In combination, in a machine of the character described, an upright rotary shaft, a disc cutter mounted on the lower end of said shaft, and a trash impeller on said shaft having a maximum diameter less than the diameter of said disc cutter.

21. In combination, in a machine of the character described, an upright rotary shaft, a disc cutter mounted on the lower end of said shaft and a trash impeller on said shaft comprising fins or blades projecting in opposite directions therefrom above said disc cutter, the radial length of said fins or blades being less than the radius of said disc cutter.

22. In combination, in a machine of the character described, a pair of upright parallel rotary shafts mounted side by side, cooperating rotary disc cutters mounted on the lower ends of said shafts, and trash impellers for the shafts provided with projecting fins or blades, the radial length of said fins or blades being less than the radii of said disc cutters.

23. In combination, in a machine of the character described, a pair of upright laterally spaced rotary shafts, cooperating disc cutters mounted on the lower ends of said shafts, and trash impellers for said shafts provided with projecting fins or blades, the radial length of said fins or blades being less than one half the distance between the shafts, whereby the paths of revolution of said trash impellers do not overlap.

24. In combination, in a machine of the character described, a pair of laterally spaced upright rotary shafts, disc cutters mounted on the lower ends of said shafts, and trash impellers for said shafts provided with broad substantially vertical fins or blades extending substantially radially from said shafts and rearwardly curved at their outer edges, the radial length of said fins or blades being less than the radii of said disc cutters.

25. In combination, in a machine of the character described, a pair of laterally spaced upright rotary shafts, overlapping disc cutters mounted on the lower ends of said shafts, said cutters rotating towards each other and rearwardly in the direction of travel of the machine, and trash impellers for said shafts provided with projecting fins or blades, the radial length of said trash impellers being less than the radii of the discs cutters by an amount at least as great as the overlap of the cutters.

26. In a cane harvester provided with conveyor chains or the like for conveying the cut cane stalks through the machine after severance from the ground, the combination of a pair of upright laterally spaced rotary shafts, cooperating disc cutters mounted on the lower ends of said shafts, and trash impellers for said shafts provided with projecting fins or blades of less radial length than the radii of the disc cutters, whereby the free passage rearwardly of the cane stalks between the shafts and impellers is permitted.

GEORGE D. LUCE.